United States Patent Office 3,192,177
Patented June 29, 1965

3,192,177
VINYL ALCOHOL POLYMER COMPOSITIONS PLASTICIZED WITH CERTAIN TRIALKYL PHOSPHATES
Joseph G. Martins, Ludlow, Mass., assignor to Shawinigan Resins Corporation, Springfield, Mass., a corporation of Massachusetts
No Drawing. Filed Aug. 1, 1960, Ser. No. 46,340
4 Claims. (Cl. 260—30.6)

This invention pertains to the plasticization of vinyl alcohol polymers with particular water-dispersible plasticizers, which plasticized compositions being particularly suitable for the preparation of water-dispersible films useful for packaging such materials as detergents, dyes, insecticides and bleaching agents. More particularly, the invention relates to the plasticization of vinyl alcohol polymers with particular organo-phosphorus compounds to provide plasticized compositions yielding improvements both in the final properties of a water-dispersible film as well as in its preparation. By "water-dispersible" films is meant both those films which are completely water-soluble as well as those films which are sufficiently water-soluble that when employed for packaging detergents, bleaches, etc., where it is intended to dispense the packaged material by immersion of the entire package in water, that the packaging film would sufficiently disintegrate so as to release the packaged material even though some residue from the insoluble portion of the packaging film thereafter remained.

Water-dispersible films have been prepared from a vinyl alcohol polymer which has been plasticized either internally or externally. The purpose of the plasticization has been primarily to flexibilize the film at lower temperatures in order to eliminate the obvious problems attendant to brittleness of the film especially in packaging applications. The known external plasticizers for vinyl alcohol polymers are polyols, including, the lower glycols generally and especially glycerine. Vinyl alcohol polymers plasticized with the known polyols become objectionally softened in high relative humidity and are brittle and tender at low relative humidity. Another objection to the polyols or any other type of humectant plasticizer, is that they tend to dry out over a period of time, which makes the film again very brittle or fragile, hence reducing its suitability for almost any long term application. Still another objection to the use of polyols as external plasticizers for vinyl alcohol polymers is the blocking or sticking together of film prepared from such plasticized composition at high relative humidity or after exudation of the plasticizer.

The internal plasticization of vinyl alcohol polymers has generally been accomplished by modification of the alcohol chemical structure as for example by ethoxylation of the alcohol group, such as is shown in U.S.P. 2,936,263. Modification of the alcohol chemical structure has the obvious disadvantage of adding a processing operation prior to the preparation of the final form of the polymer, e.g., film. The additional processing operation by reason of requiring generally the use of specialized equipment and manpower expenditure, increases the cost of the plasticized composition to the user and thereby promotes a more limited use of the material.

It is the purpose of the present invention to provide plasticized vinyl alcohol polymer compositions which will avoid all of the above disadvantages.

It is another purpose of the present invention to provide plasticized compositions having greatly improved properties both during the preparation of the final form of the plasticized composition, e.g., film, as well as in said final form.

It is still another object of the present invention to provide means for the preparation of the plasticized vinyl alcohol polymer compositions.

The above and related objects are accomplished with a polyvinyl alcohol plasticized with water-dispersible alkyl esters of phosphoric acid, including halogen substituted products thereof.

The invention may be practiced in its preferred embodiment as shown in the following examples in subsequent discussions thereon but is not limited thereto. Where parts and percentages appear hereinafter in the specification and claims, they are parts and percentages by weight unless otherwise specified.

*Example 1*

One hundred parts of an aqueous 20% solution of a partially hydrolyzed polyvinyl acetate having a residual polyvinyl acetate content of 30% and a viscosity of 4.6 centipoises for a 4% aqueous solution at 20° C. is added to a suitable mixing vessel equipped with means for mechanical agitation. Into this solution is charged 4 parts of tris (chloroethyl) phosphate. The plasticizer was mixed into the partially hydrolyzed polyvinyl acetate solution at room temperature and with continued agitation for 10 minutes whereupon a homogeneous but bubbly solution was produced. The solution was de-bubbled by heating at 50° C. for 2 hours and films cast from the resulting clear colorless solution on polished metal plates by conventional means. The cast films were dried at 70° C. for 1 hour and thereafter formed into small packets containing commercially available domestic detergent by means of ordinary heat-sealing techniques.

The packets were first subjected to 100% relative humidity at 72° F. for 24 hours for test purposes. After the test period, these products were observed and the film comprising said packaging envelope found to be free from tackiness, continuous and by all visual indication in a substantially unchanged condition from the original. As distinct therefrom, other packets prepared from the same partially hydrolyzed polyvinyl acetate plasticized with a humectant plasticizer of the type previously disclosed when tested in like manner as the above composition became sufficiently tacky so as to actually stick together and the films of these packets were found to have lost continuity and physical integrity. Other packets prepared from the plasticized partially hydrolyzed polyvinyl acetate of the example were subjected to 3 day tests at 0% relative humidity and 140° F. and the films found still to possess their original physical continuity and freedom from embrittlement.

The water-redispersibility of the above tested packets was measured by depositing said packets in warm water at 100° F. with mild agitation. The packets prepared from the plasticized composition of the example were found to dissolve completely releasing the detergent, thereby retaining the redispersibility of the original untested material.

The film properties of the above composition can still be further distinguished from those of films prepared from partially hydrolyzed polyvinyl acetate plasticized with humectant type plasticizers, viz., glycerine and ethylene glycol as regards improved low temperature flexibility. Test films of approximately 2 mils thickness were immersed in an air bath over calcium sulfate in a Dewar flask and the temperature of the air surrounding the films then gradually lowered. At the desired temperature the films were briskly snapped manually and observed for cracks. Whereas the films prepared from the composition of the example cracked at −35° C., films prepared from partially hydrolyzed polyvinyl acetate plasticized with a like amount of either glycerine or ethylene glycol cracked at 0° C.

*Example 2*

A plasticized composition was prepared according to the method described in Example 1 from an aqueous mixture containing 75 parts of a partially hydrolyzed polyvinyl acetate having a viscosity of approximately 45–50 centipoises for a 4% solution at 20° C. and a residual acetate content of approximately 35% with 25 parts of tris(chloroethyl) phosphate plasticizer. The physical properties of films prepared from the above composition and tested according to the procedure outlined in Example 1 were substantially comparable to the physical properties of the plasticized composition of said Example 1.

*Example 3*

A plasticized composition was prepared according to Example 1 except that for the plasticizer used therein, there was substituted 4 parts of triethyl phosphate. The physical properties of films prepared from the above composition and tested according to the procedure outlined in Example 1 were substantially comparable to the physical properties of the plasticized composition of said Example 1.

*Example 4*

A plasticized composition was prepared according to Example 1 except that for the plasticizer used therein was substituted 20 parts per hundred parts resin of tris(chloroisopropyl) phosphate. The physical properties of films prepared from the above composition and tested according to the procedure outlined in Example 1 were substantially comparable to the physical properties of the plasticized composition of said Example 1.

*Example 5*

To still further illustrate the preparation of other compositions within the contemplation of the invention, plasticized composition was prepared according to Example 1 except that for the plasticizer used therein there was substituted 20 parts per hundred parts resin of tris(chloroethyl) phosphate and 10 parts per hundred parts resin of a commercial mixture of phenyl ethers of polyethylene oxide having an average molecular weight of 270, a specific gravity at 25° C. of 1.119 and a refractive index at 25° C. of 1.502. The physical properties of films prepared from the above composition and tested according to the procedure outlined in Example 1 were substantially comparable to the physical properties of the plasticized composition of said Example 1.

In order to demonstrate the unexpected improvements obtained with the plasticizers of the present invention compared with other known organo-phosphorus plasticizers, Examples 6–8 are shown for comparison purposes. Example 6 employs an alkyl diaryl phosphate, available commercially from the Monsanto Chemical Company under the trademark Santicizer 141. Examples 7–8 illustrate the use of aryl phosphates, namely triphenyl phosphate and tricresyl phosphate, respectively.

*Example 6*

To 100 parts of a 20% by weight aqueous solution of the partially hydrolyzed polyvinyl acetate of Example 2 is added 4 parts of Santicizer 141 with agitation. The solution is thereafter debubbled and a film cast therefrom according to the method of Example 1. The air dried films were hazy and possessed elongations at rupture of less than 75% in contrast to the minimum values of 150% obtained for the clear films of the invention. The result of the low temperature brittleness test described in Example 1 for the above composition was 0–5° C. as distinct from the −35° C. for the composition of that example.

*Example 7*

A plasticized composition was prepared according to Example 6, except that for the plasticizers used therein, there was substituted 4 parts of triphenyl phosphate. The physical properties of films prepared from this composition were substantially comparable to the physical properties of the plasticized composition of said Example 6.

*Example 8*

A plasticized composition was prepared according to Example 6, except that for the plasticizer used therein, there was substituted 4 parts of tricresyl phosphate. The physical properties of films prepared from this composition were substantially comparable to the physical properties of the plasticized composition of said Example 6.

The plasticized vinyl alcohol polymers of the present invention can best be characterized by the final properties of the films prepared therefrom. The present films are clear, glossy and continuous in character, and possess tensile strengths at rupture in the range 3500–8000 p.s.i. and a percent elongation at rupture of approximately 150–400. In addition to these characteristics the present films possess a retention of physical integrity under severe climatic conditions. By retention of "physical integrity" is meant substantially less change in such physical properties as flexibility and strength at extremes of ambient conditions, as for example, 50% relative humidity at 20° F., 100% relative humidity at 23° F., and 88% relative humidity at 140° F. as compared with vinyl alcohol polymers plasticized with the humectant type plasticizers of the prior art. The plasticized compositions of the invention can also be characterized by certain novel properties exhibited during the preparation of film from the plasticized compositions. More specifically, the present plasticized compositions can now be prepared in final film form by means of more efficient processing than was heretofore possible. For example, films may be formed by the well known blow-forming technique directly from the present compositions without need for the incorporation of water into the plasticized composition as is general practice with all other type plasticized vinyl alcohol polymer compositions. Additionally, preparation of film packets prepared from the present plasticized compositions is more efficient by reason of the greatly improved "machining" characteristics of the film. The prior art compositions tend to rupture, stick to the machinery and otherwise tend to disrupt the operation of the high speed machines used to prepare the film packets heretofore disclosed. The present plasticized compositions also "machine" better than an unplasticized vinyl alcohol polymer.

The quantity of plasticizer which can be combined with the vinyl alcohol polymer to form plasticized resin compositions having the improved properties hereinbefore described is a function of the type and molecular weight of the vinyl alcohol polymer and the chemical structure and molecular weight of the plasticizer. The quantity of these plasticizers is not limited with the vinyl alcohol polymer, since satisfactory films were obtained with the plasticizer at all levels of plasticizer content tested. The maximum quantity of plasticizer to be incorporated will therefore be determined by such considerations as desired final properties, application for the plasticized composition, etc. The minimum amount of plasticizer to be employed is likewise dictated by these same considerations although as low as 1% plasticizer was found to substantially improve the flexibility of the vinyl alcohol polymer.

The preferred plasticized compositions of this invention comprise 95–75 parts of the vinyl alcohol polymer plasticized with 5–25 parts of the organo-phosphorus compound. In the preferred range, the plasticizer is non-migratory and will yield films free from tack, limpness and a greasy feel even at the adverse climatic conditions of temperature and relative humidity extremes normally encountered during the warehousing and transportation of such packaged products as foods, etc. Still another reason for the preferred range is that the best balance of improved properties in films obtained from the plasticized compositions is obtained therein, as illustrated by the above examples.

The vinyl alcohol polymer component of the plasticized resin compositions of this invention can be selected from the general class consisting of water-dispersible copolymers of vinyl alcohols with other monomers copolymerizable with vinyl esters. Useful polymers include a copolymer formed by the hydrolysis of a vinyl ester homopolymer as well as terpolymers formed by the copolymerization of a vinyl ester with another copolymerizable monomer and the further hydrolysis product thereof. For example, the useful vinyl ester homopolymers which may be directly hydrolyzed to yield a substantially water-dispersible polymer include polymers of vinyl acetate, vinyl propionate, vinyl butyrate, vinyl hexoate, vinyl benzoate and the like. As typical of the terpolymer type of useful vinyl alcohol polymer wherein a copolymer of a vinyl ester is further hydrolyzed to yield a substantially water-dispersible polymer there are included copolymers of a vinyl ester with esters of copolymerizable monoethylenically unsaturated dicarboxylic acids, such as dibutyl maleate, diethyl fumarate, dioctyl maleate and the like; copolymers of a vinyl ester with other vinyl esters, such as vinyl propionate, vinyl butyrate, vinyl hexoate, vinyl benzoate and the like; copolymers of a vinyl ester with a vinyl halide, such as vinyl chloride and vinyl bromide; copolymers of a vinyl ester with lower alkyl esters of acrylic acid such as methyl acrylate, propyl acrylate, butyl acrylate, hexyl acrylate, octyl acrylate and the like; copolymers of a vinyl ester with lower alkyl esters of methacrylic acid such as methyl methacrylate, propyl methacrylate, butyl methacrylate, hexyl methacrylate, octyl methacrylate and the like; copolymers of a vinyl ester with monoethylenically unsaturated carboxylic acids such as acrylic acid, methacrylic acid, crotonic aid and the like; copolymers of vinyl esters with other ethylenic monomers, such as ethylene, propylene, isobutylene and others. The useful vinyl alcohol polymers are well known as are their methods of preparation as hereinafter disclosed.

The preferred type of vinyl alcohol polymer is the copolymer of a vinyl ester with vinyl alcohol formed by the direct hydrolysis of the vinyl ester, which copolymer contains from 0–80 weight percent residual ester groups, and may be made according to U.S. Patents 2,502,715 and 2,643,994. The water-dispersible characteristics of this type polymer are well known and dependent upon molecular weight as well as residual acetate content considerations. Within the range of residual acetate content disclosed, suitable polymers may be selected ranging in molecular weight as determined by viscosity measurements, from 1.3–100 centipoises for a 4% aqueous solution of the polymer at 20° C. To further illustrate the dependence of the polymers' water-dispersibility upon molecular weight and residual acetate content for the practice of the invention, it can be said that whereas a partially hydrolyzed polyvinyl acetate having a 70–76% residual acetate content and a 6–7 centipoise viscosity for a 4% by weight solution in an equipart mixture of isopropanol and water is a suitable material, the copolymer having the same residual acetate content but a viscosity of 70–95 centipoises is unsuitable.

In the preferred compositions of the invention comprising 95–75 parts vinyl alcohol polymer and 5–25 parts plasticizer, the preferred vinyl alcohol polymers consist of partially hydrolyzed polyvinyl acetate having a viscosity in the range 4–60 centipoises for a 4% aqueous solution at 20° C. and a residual acetate content in the range 26–45%. At higher molecular weights for the vinyl alcohol polymer some plasticizer migrates when incorporated in the levels above shown and in addition films prepared from the plasticized composition do not have adequate cold water dispersibility. When lower molecular weight hydrolyzed polyvinyl acetates are employed to prepare the plasticized composition, the films obtained therefrom lack optimum strength, continuity and some plasticizer is exuded. The 26–45% residual acetate range above shown is preferred for maximum water dispersibility of the film prepared from the plasticized composition. Above a 45% acetate content the vinyl alcohol polymer loses some hot water solubility. Below the 26% acetate content the compatibility with the preferred plasticizers is reduced.

The particular plasticizers of the present invention can be selected from the broad class of alkyl esters of phosphoric acid identifiable by the generic formula $$(RO)_3PO$$

wherein R is a radical selected from the class consisting of aliphatic hydrocarbons containing 2 to 8 carbon atoms and halogen substituted products thereof. The suitable plasticizers are dispersible in an aqueous medium containing polyvinyl alcohol and may further be characterized by a substantial absence of migration in the plasticized composition. More specifically, for any particular plasticizer in the above class it can be said that the phosphate moiety of the plasticizer is hydrophyllic in nature whereas the alkyl radical is of hydrophobic character. The significance of this as regards the behavior of the plasticizer in the plasticized composition can be realized by taking into consideration the inherent hygroscopic character of the vinyl alcohol polymer. Therefore, any plasticizer which itself is not sufficiently hydrophillic in nature will be exuded from the plasticized composition by reason of its incompatibility with the moisture picked up in the vinyl alcohol polymer. Suitable plasticizers may therefore be characterized as those wherein the hydrophillic nature of the plasticizer attributable to the phosphate radical is not overcome by the hydrophobic nature of the alkyl radical. The suitable plasticizer may be determined without undue experimentation by simply preparing the plasticized compositions according to the preferred embodiment of the examples and applying the above described tests of water-dispersibility and substantial absence of migration. The plasticizers illustrated in the above examples are preferred because of comparatively less migration tendencies at higher concentration of the plasticizer in combination with the preferred vinyl alcohol polymers of the invention. It will be noted from said above examples, the preferred plasticizers are generally the halogen substituted alkyl esters and it is believed that the polar nature of any halogen atom results in better retention of the plasticizer in the final composition.

As will be obvious from Example 5 certain plasticizers other than the type above described can be employed along with the plasticizers of the invention with good results. For example, the plasticizers disclosed in the co-pending application of the applicant Serial No. 40,170, now abandoned, filed July 1, 1960, are compatible with the plasticizers of this invention in all proportions disclosed without resulting in plasticizer migration. It will also be obvious that mixtures of the plasticizers of the present invention are suitable.

The method of incorporation of the plasticizer is not critical and any of the well known methods therefor may be employed. Besides utilizing the method taught in the above examples, the plasticizer may be incorporated into a mass of the vinyl alcohol polymer in a Banbury mixer. The latter method of plasticization when followed by pelletizing and eventually blow extruding yields films which possess excellent properties.

It is not intended to limit the present invention to a mixture of a vinyl alcohol polymer and a plasticizer. For example, the addition of antioxidants and slip agents into the present compositions result in further improved properties of the plasticized compositions. It will be obvious that pigments, pigment extenders and other inert materials may also be added to the present plasticized compositions without difficulty. It is to be understood therefore that this invention is not to be limited except by the scope of the following claims.

What is claimed is:

1. A plasticized water dispersible resin composition comprising a mixture of 95–75 parts of a partially hydrolyzed polyvinyl acetate having 26–45% residual acetate groups and a viscosity in the range 4–60 centipoises for a 4% aqueous solution at 20° C., with 5–25 parts of a plasticizer having the general formula $$(RO)_3PO$$

wherein R is a radical selected from the class consisting of aliphatic hydrocarbons containing between 2–8 carbon atoms and halogen substituted products thereof.

2. A plasticized resin composition as in claim 1 wherein the plasticizer is tris(chloroethyl) phosphate.

3. A plasticized resin composition as in claim 1 wherein the plasticizer is tris(chloroisopropyl) phosphate.

4. A plasticized resin composition as in claim 1 wherein the plasticizer is triethyl phosphate.

References Cited by the Examiner

UNITED STATES PATENTS

| 2,866,808 | 12/58 | Kolka | 260—461 |
| 2,990,421 | 6/61 | Melton et al. | 260—30.6 |

FOREIGN PATENTS

| 632,760 | 12/49 | Great Britain. |
| 731,983 | 6/55 | Great Britain. |
| 796,899 | 6/58 | Great Britain. |

MORRIS LIEBMAN, *Primary Examiner.*

DANIEL ARNOLD, LEON J. BERCOVITZ, ALEXANDER H. BRODMERKEL, *Examiners.*